US000001285H

United States Statutory Invention Registration [19]

[11] Reg. Number: H1285

Toya

[43] Published: Feb. 1, 1994

[54] SILVER HALIDE PHOTOGRAPHIC EMULSION AND MATERIAL

[75] Inventor: Ichizo Toya, Kanagawa, Japan

[73] Assignee: Fuji Photo Film Co., Ltd., Minami-ashigara, Japan

[21] Appl. No.: 692,786

[22] Filed: Apr. 29, 1991

Related U.S. Application Data

[63] Continuation of Ser. No. 433,250, Nov. 8, 1989, abandoned.

[30] Foreign Application Priority Data

Nov. 8, 1988 [JP] Japan ..... 63-281851

[51] Int. Cl.[5] ..... G03C 1/005

[52] U.S. Cl. ..... 430/569; 430/567

[58] Field of Search ..... 430/567, 569

[56] References Cited

U.S. PATENT DOCUMENTS

| | | | |
|---|---|---|---|
| 4,614,711 | 9/1986 | Sugimoto et al. | 430/567 |
| 4,798,775 | 1/1989 | Yagi et al. | 430/569 |
| 4,801,526 | 1/1989 | Yoshida et al. | 430/567 |
| 4,806,461 | 2/1989 | Ikeda et al. | 430/569 |
| 4,977,074 | 12/1990 | Saitou et al. | 430/567 |

FOREIGN PATENT DOCUMENTS

| | | |
|---|---|---|
| 0282896 | 9/1988 | European Pat. Off. . |
| 0326853 | 8/1989 | European Pat. Off. . |
| 2108386 | 4/1972 | France . |

*Primary Examiner*—Robert L. Stoll
*Assistant Examiner*—Joseph D. Anthony
*Attorney, Agent, or Firm*—Sughrue, Mion, Zinn, Macpeak & Seas

[57] ABSTRACT

A silver halide photographic emulsion is disclosed, comprising silver halide grains containing a first silver halide phase containing at least 3 mol % of silver iodide and having a completely uniform silver iodide distribution, and a second silver halide phase having at least 5 dislocation lines.

11 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC EMULSION AND MATERIAL

This is a continuation of application Ser. No. 07/433,250, filed Nov. 8, 1989, now abandoned.

FIELD OF THE INVENTION

This invention relates to photosensitive silver halide emulsions and materials which are useful in the field of photography, and in particular relates to silver halide emulsions comprising a dispersant and silver halide grains containing silver iodide.

BACKGROUND OF THE INVENTION

With regard to photosensitive silver halide emulsions for use in the photographic field, emulsions other than silver iodobromide emulsions have only limited application in high speed camera photographic elements. As used in the photographic field, silver iodobromide grains normally contain silver iodide in the silver bromide crystal lattice in an amount not greater than the solubility limit in silver bromide, i.e., an iodide content of up to approximately 40 mol %. The iodide contained in a silver iodobromide emulsion has the following merits (1) and disadvantages (2).

(1) An increase in the latent image formation efficiency, increase in the light absorbance (the intrinsic absorbance of the silver halide), improvement in the adsorption of additives and improvement in the graininess.

(2) Inhibition of development, impairment of chemical sensitization.

To date, there have been a great many studies concerning enhancing the aforementioned merits, and minimizing the disadvantages in the evolution of silver iodobromide photographic materials having useful camera speeds. A particularly important consideration has been in regard to the location (e.g., portion or site) of the silver iodide in the silver halide emulsion grains (referred to as "grains" hereinafter).

The following is disclosed on p. 18 of *Photographic Emulsion Chemistry* (Duffin, Focal Press, 1966). "An important factor to be considered in the case of iodobromide emulsions is the location of the iodide which may be present mainly at the center of the crystal, distributed throughout the grain or mainly on the outside. The actual location of the iodide is determined by the preparation conditions and will clearly have an influence on the physical and chemical properties of the crystal."

In the single jet method wherein both the iodide and bromide salts are charged in their established concentration in the reaction vessel, and then silver iodobromide grains are formed by introducing an aqueous silver salt solution into the reaction vessel, the silver iodide is first precipitated, and it therefore becomes easier for the silver iodide to collect in the center of the grain. On the other hand, with the double jet method wherein both the iodide and bromide salts are simultaneously introduced into the reaction vessel together with the silver salts, it is possible to control the distribution of the silver iodide within the grain as desired.

For example, it is possible to distribute the silver iodide uniformly over the entire grain, or to form a shell of silver iodide or of silver iodobromide with a high silver iodide content on the outer surface (outside) of the grain by decreasing or stopping the addition of the bromide salts during grain formation while continuing with the addition of the iodide salts. JP-A-58-113927 (the term "JP-A" as used herein means an "unexamined published Japanese patent application") discloses a silver halide emulsion containing tabular silver iodobromide in which at least 50% of the total projected surface area is comprised by tabular silver iodobromide grains having a thickness of less than 0.5 μm, a diameter of 0.6 μm or more and an average aspect ratio of 8 or more, and in which the said tabular grains have first and second opposite parallel principal surfaces and a central region extending between the said two principal surfaces, and in which the silver iodide content in an inner portion in a transverse direction of the central region extending between the 2 main surfaces is lower than the iodide content in at least one outer portion of the central region. JP-A-59-99433 discloses a silver halide emulsion containing silver halide grains in which 10% (by number) or more of the silver halide grains present in the silver halide emulsion are tabular silver halides having an aspect ratio of 5 or more and containing silver iodide in the region from the center in the long-axis direction or the short-axis direction of the grain to a portion within 80 mol % with respect to the amount of silver in the entire grain (high internal iodide phase), wherein the average iodide content of the high-internal iodide phase is not less than 5 times the average iodide content of the silver halide present outside the phase, and wherein the silver amount in the high-internal iodide phase is 50 mol % or less of the amount of silver in the entire grain. Furthermore, JP-A-60-1477277 discloses a silver halide photographic emulsion containing silver halide grains wherein, in silver halide grains having a multilayer structure and an aspect ratio of 5 or less, the difference between the average iodide content of 2 arbitrary layers adjacent within the said grains and respectively having homogeneous iodide distributions is 10 mol % or less, and in which the total silver iodide content of the silver halide grains having this multilayer structure is 10 mol % or less.

JP-A-60-14331 discloses a silver halide photographic emulsion containing silver halide grains with a distinct laminar structure, characterized in that they are composed of a core containing 10 to 45 mol % of silver iodide and a shell containing 5 mol % or less of silver iodide, and in that the average silver iodide content is 7 mol % or more. Furthermore, JP-A-61-245151 discloses a silver halide emulsion characterized in that it has a laminar structure with a plurality of different silver halide contents, the silver iodide content of the outermost shell being 10 mol % or less, a high-silver iodide shell with a silver iodide content at least 6 mol % higher than the abovementioned outermost shell is provided on the inside of the abovementioned outermost shell, and an intermediate shell having an intermediate silver iodide content is provided between the abovementioned outermost shell and the abovementioned high-silver iodide shell. With regard to details further described in the above-noted patents, the amount of silver iodide contained in any one of the grains is modified in terms of its location (in particular, whether the silver iodide is present on the inside or outside of the grain to thereby obtain various photographic characteristics.

On the other hand, Y. T. Tan and R. C. Baetzold have calculated energy states for silver halides and, at the 41st annual meeting of the SPSE, have advanced the theory that the iodide has a tendency to form clusters in silver iodobromide crystal grains. With regard to the silver iodide distribution in the tabular silver iodobromide grains described above, there is a variation in the amount of silver iodide contained in different areas of the grain over an interval of at least 300 to 1,000 Å, but a more microscopically non-uniform silver iodide distribution is observed in the silver iodobromide crystals as predicted by Y. T. Tan and R. C. Baetzold.

The silver halide grains having a completely uniform silver iodobromide phase as described in Japanese Patent Application No. 63-7853 (corresponding to U.S. Pat. application Ser. No. 07/298,601 filed Jan. 18, 1989) exhibit a high speed due to this uniformity, but are ineffective in terms of speed when the developing time is shortened. It is possible to determine the microscopic silver iodide distribution and dislocation lines in silver iodobromide grains by means of a cooled transmission electron microscope, and the silver halide grains in which the silver iodide distribution is completely uniform as disclosed herein have not been obtained hitherto.

SUMMARY OF THE INVENTION

An object of the present invention is to provide a negative silver halide emulsion of low fogging and high speed (in particular, a high speed with a shortened developing time), having improved graininess and sharpness and covering power, and with outstanding storage properties and pressure resistance.

The object of this invention is achieved by means of a silver halide photographic emulsion comprising silver halide grains containing a first silver halide phase containing at least 3 mol % of silver iodide and having a completely uniform silver iodide distribution, and a second silver halide phase having at least 5 dislocation lines.

DETAILED DESCRIPTION OF THE INVENTION

Figure 1:
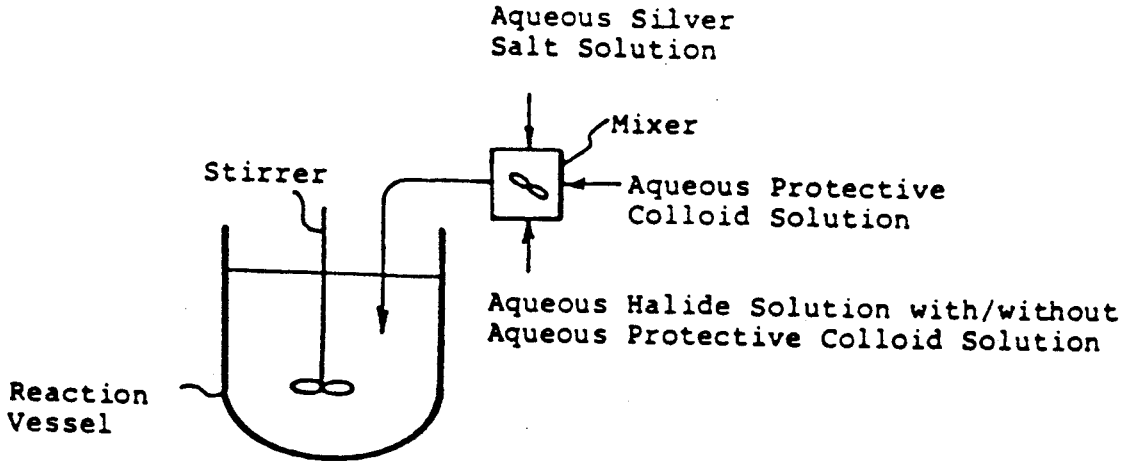
FIG. 1 is a schematic view showing a process of supplying fine silver halide grains from a mixer disposed outside of a reaction vessel as one of the emulsion production processes of the present invention.

The phase having the completely uniform silver iodide distribution of the present invention can be observed by the method described in Japanese Patent Application No. 63-7853. In addition, the phase having the 5 or more dislocation lines and a year-ring-like (i.e., similar in appearance to the year lines in a cross section of a free) microscopic non-uniform phase and uniform phase can be observed by a direct method using a transmission electron microscope at low temperature as described on p. 57 of Volume 11 of *Photographic Science and Engineering* by J. F. Hamilton (1967) and p. 213 of Volume 35, No. 4 of *Nippon Shashin Gakkai* (Japanese Photographic Studies Society 1972) by M. Shiozawa. Thus, silver halide grains handled under a safelight in such a way that the emulsion grains are not exposed to form a latent image are mounted on an electron microscope observation mesh. Observation is carried out using the transmission method with the sample in a state whereby it is cooled by liquid nitrogen or liquid helium in order to prevent damage from the electron beam (e.g., exposure to form latent image and the like).

Here, the higher the accelerating voltage of the electron microscope, the clearer the image obtained, and this is generally 200 Kvolt for a grain thickness up to 0.25 μm, and 1,000 Kvolt for larger grain thicknesses. It is preferable to cool the sample with liquid helium rather than liquid nitrogen since damage to the grain by the irradiated electron beam increases with the higher accelerating voltage.

The magnification can be appropriately adjusted in accordance with the sample grain size, and it is from 20,000 to 40,000 times.

As stated hitherto, the phase with the "completely uniform silver iodide distribution" of the present invention may be clearly discriminated from conventional silver halide grains by observing the transmitted image of the grains using a cooled transmission electron microscope. Thus, the microscopic lines originating in the microscopic nonuniformity of the silver iodide are present in at most 2 lines, preferably 1 line and more preferably are not present in a 0.2 μm interval in the direction orthogonal to the lines in the silver halide grains containing silver iodide of the present invention. The lines which indicate the microscopic nonuniformity of the silver iodide and constitute a year-ring-like striped pattern, occur in a form orthogonal to the direction of grain growth. As a result, these lines are distributed in concentric form from the center of the grain. For example in the case of the tabular grains, since the lines which show the nonuniformity of the silver iodide and constitute a year-ring-like striped pattern are orthogonal in the direction of growth of the tabular grains, they are consequently parallel to the edges of the grains. The direction orthogonal to the lines remains facing the center of the grains, and the lines are distributed in a concentric form about the center of the grain.

Naturally, if the silver iodide content is suddenly changed during grain growth, the boundary line is observed as the same kind of line as described above using the above noted observation method, but such a change in the silver iodide content only creates a single line and is clearly distinguished from that created by a plurality of lines originating in microscopic nonuniformities in the silver iodide. Furthermore, the lines originating from such changes in the silver iodide content may be clearly distinguished by measuring the silver iodide content on both sides of the line with the analyzing electron microscope described above. Such lines caused by changes in the silver iodide content are indicative of the "macroscopic silver iodide distribution" which is completely different than the lines originating from microscopic nonuniformity of the silver iodide, in the sense of the present invention.

The present invention is such that a phase having 5 or more, preferably 10 or more, dislocation lines is introduced into a silver halide grain having a microscopically uniform silver iodide phase. The introduction of the phase having 5 or more dislocation lines makes it ease to generate a collected nucleus by way of controlling sites of the latent image formation, whereby the speed can be increased.

Furthermore, when the silver iodide content is varied substantially continuously in the growth of the grain, since there is not sudden change in the silver iodide content, the above-described dislocation lines showing macroscopic changes in the silver iodide content are not observed. Therefore, if at least 3 lines are present in a 0.2 μm interval, this constitutes a nonuniformity in the microscopic silver iodide content.

In this way, the silver halide grains having a phase of completely uniform silver iodide distribution of the present invention are grains having at most 2 lines indicative of a microscopic silver iodide distribution (i.e., year-ring-like lines) in a 0.2 μm interval in the direction orthogonal to the lines in a transmitted image of the grains obtained using a cooled transmission electron microscope; and preferably have 1, and more preferably have no such lines, and constitute at least 60%, preferably at least 80% and more preferably at least 90% by number of all of the emulsion grains.

Regarding the silver halide grains which have hitherto been considered to be silver halide grains containing a uniform silver iodide, there has been not more than the addition of silver nitrate and a halogen salt mixture with a fixed composition (fixed content of iodides) into the reaction vessel using the double jet method during grain formation. While the macroscopic silver iodide distribution of such grains is certainly fixed, the microscopic silver iodide distribution is not uniform. In the present invention, such grains are called grains having a "fixed halogen composition", and are clearly distinguished from the grains of the present invention which are "completely uniform".

A production method for the microscopically uniform phase of the silver halide grains of the present invention is given below. As explained in detail later, the production method for obtaining grains of the present invention relates to the method of grain growth, and the present invention has no bearing on nucleus formation. On p. 89 of the fourth edition of *The Theory of the Photographic Process* by T. H. James (published by Macmillan Publishing Co., Ltd.) it is written "It is thought that in many cases, crystallization is composed of two main processes, namely nucleus production and growth. (Under certain circumstances, another two processes of Ostwald ripening and recrystallization occur). In nucleus formation, a completely new crystal is produced and a sudden increase in the number of crystals occurs in this process. In growth, new layers are added to the already present crystals." The grains of the present invention and the production method therefor relate to this growth process. A previously known method is used for the nucleus formation. Thus, the nucleus is shown in the transmission image in which the finished grains are photographed using a cooled transmission electron microscope, but the center of the grain is outside the objective of this invention. After the completion of nucleus formation, and growth of a new layer the boundary line between the nucleus crystal and the growth phase may be determined as a line in the transmitted image, and it is possible to determine this boundary with further clarity if there is a difference between the halogen composition of the nucleus and the growth phase in particular.

The dislocation lines of the silver halide grains of the present invention denote a production method for producing a phase with 5 or more dislocation lines therein.

It is possible to introduce a phase with 5 or more dislocation lines by interrupting the addition of the solution containing silver, and suddenly adding a halogen solution during a stage while the silver halide is still in progress of reaching its final grain size and final grain form. This interruption in addition may be carried out while between 10% and 99%, and preferably between 20% and 95% of the total amount of the silver has been added.

Silver iodobromide, silver iodochloride and silver iodochlorobromide are all acceptable as compositions for the silver halide grains of the present invention, but silver iodobromide or silver iodochlorobromide is preferably used. The position within the grain of the phase containing the silver iodide may be the center of the silver halide grain, may extend across the whole of the grain, or it may be present on an outside portion thereof. Furthermore, there may be one or a plurality of phases in which the silver iodide is present. In general, there will be many cases in which the phase containing the silver iodide produces a laminar structure due to the specific procedure grain growth employed, but a specific iodide portion may also be formed. For example, a silver iodide phase may be formed on only an edge or only a corner of the grain, making use of differences in the nature of the edges and corners of tabular grains.

In addition, if a further shell is formed outside the silver iodide phase, silver halide grains may be formed having silver iodide at particular points and which do not have a laminar structure within the grain.

For example, after nucleus formation, grain growth may be carried out by the system described below.

The proportion of silver halide within the grain occupied by the silver halide phase containing a completely uniform silver iodide distribution of the invention is preferably from 5 to 95 mol %.

The silver iodide content of the uniform silver iodide phase contained in the emulsion grains of the present invention is from 3 to 45 mol % and preferably from 5 to 35 mol %. Where the silver iodide content is less than 3 mol %, even when microscopic silver iodide nonuniformities are present, their distribution latitude is essentially slight, and no great inconvenience will incur.

The overall silver iodide content of the emulsion grains of the present invention is 2 mol % or more, preferably 4 to 25 mol %, and more preferably 5 to 15 mol %. The size of the silver halide emulsion grains of the present invention is not particularly limited, but is preferably 0.3 μm or greater, and the results are further enhanced at 0.8 μm or greater and particularly at 1.4 μm or greater. The silver halide grains of the present invention may have a regular crystal form (normal crystal grains) such as cubic, octahedral, dodecahedral, tetradecahedral, 24-faced shape (trisoctahedron, tetrahexahedron or icositetrahedron) and 46-faced shape, or may be of an irregular crystal form such as spherical or potatoshaped, or again may be grains of various shapes having one or more twin crystal surfaces including hexagonal tabular grains and triangular tabular grains having 2 or 3 parallel twin crystal surfaces.

A production method for the silver halide grains of the present invention is specifically described below. The production method for the silver halide grains of the present invention comprises nucleus formation and grain growth, but, as discussed previously, this invention relates to grain growth, and the nucleus formation follows a conventional method.

1 Nucleus formation

The silver halide grains which constitute the nucleus of the silver halides of the present invention can be prepared using a method described in, for example, *Chemie et Physique Photographique* by P. Glafkides (published by Paul Montel, 1967), *Photographic Emulsion Chemistry* by G. F. Duffin (published by the Focal Press, 1966) and *Making and Coating Photographic Emulsion* by V. L. Zelikman et al. (published by the Focal Press, 1964). This is to say, it is possible to use any of the acidic method, neutral method, ammonia method or the like and, for reacting the soluble silver salts and the soluble halogen salts, any of the one-sided mixing method, simultaneous mixing method or combination thereof may be used.

The method in which the grains are formed in an excess of silver ions (the so-called reverse mixing method) may be used. As one form of the simultaneous mixing method, the method in which the pAg is kept constant in the liquid phase in which the silver halide is formed may be used, or the so-called controlled double jet method. According to this method, silver halide emulsions having a regular crystal form and nearly uniform grain sizes are obtained.

Two or more types of separately formed silver halide emulsions may be used by mixing.

When preparing the nucleus of the silver halide grain, it is preferable that it have a fixed halogen composition. When the internal nucleus is composed of silver iodobromide, it is preferable to use the double jet method or the controlled double jet method.

A pAg of 7 to 11 is preferable when preparing the nucleus, although this varies depending upon the reaction temperature and the type of silver halide solvent employed. Furthermore, it is preferable to use a silver halide solvent since this makes it possible to carry out grain formation in a short time. For example, a well-known silver halide solvent such as ammonia or a thioether may be used.

As the nucleus shape, a tabular shape, spherical shape or twin crystal system or else an octahedron, cube, tetradecahedron or mixed crystal system or the like may be used.

Furthermore, the nuclei may be polydisperse or monodisperse, although monodisperse nuclei are much preferred.

Furthermore, in order to arrive at a uniform grain size, it is preferable to carry out rapid growth in the region in which the critical supersaturation is not exceeded using a method in which the rate of addition of silver nitrate and the aqueous alkali halide solution is varied in accordance with the grain growth rate as described in G.B. Patent 1,535,016, JP-B-48-36890 and JP-B-52-16364 (the term "JP-B" as used herein means an "examined Japanese patent publication"), or the method in which the aqueous solution concentration is varied as described in U.S. Pat. No. 4,242,445 and JP-A-55-158124. These methods are preferable when introducing a covering layer as described below, since these methods do not cause further nucleus production, and each silver halide grain is covered uniformly.

Cadmium salts, zinc salts, lead salts, thallium salts, iridium salts or complex salts thereof, rhodium salts or complex salts thereof, iron salts or complex iron salts and the like may be present together in the silver halide grain nucleus formation or physical ripening stage.

2. Growth

After the completion of nucleus formation, water-soluble silver salts and aqueous alkali halide solutions are added to the reaction vessel, for the purpose of growing the nuclei, in such a way that there is no new nucleus production. In a conventional method, the silver salts and aqueous halogen salt solution are added to the reaction vessel with effective agitation. When growing a silver halide having a single halogen composition (for example, silver bromide, silver chloride) at this stage of growth, the silver halide phase is completely uniform and absolutely no microscopic nonuniformities are detected, even when observed under a transmission electron microscope.

When employing an emulsion originally of single halide composition, in principle, non-uniform growth does not occur and therefore, there is no nonuniformity in the sense of the present invention, in the growth of the pure silver bromide or pure silver iodide regardless of the preparation conditions. However, in the growth of silver halides employing a plurality of halide compositions (i.e., mixed crystals), non-uniform growth in the halide composition of the grains constitutes a major problem. It has been previously noted that a non-uniform silver iodide distribution is readily determined using a transmission electron microscope.

There have hitherto been various investigations with the objective of obtaining uniform silver halide growth. It is known that the growth rate of silver halide grains is greatly influenced by the silver ion concentration in the reaction solution and the equilibrium solubility. It is therefore considered that if the reaction solution concentrations (the silver ion concentration and the halide ion concentration) are not uniform, the growth rate will differ due to this difference in concentration, and non-uniform growth occurs. The techniques disclosed in U.S. Pat. No. 3,415,650, G.B. Patent 1,323,464 and U.S. Pat. No. 3,692,283 are known as methods for improving localized concentration imbalances. These methods employ a rotating hollow mixer, having slits in the wall of a chamber bulging in the middle (the inside being filled with an aqueous colloidal solution, and more preferably the mixer being divided into 2 chambers, upper and lower, by a disc), provided in a reaction vessel filled with an aqueous colloidal solution in such a way that its rotational axis is vertical. The reaction is carried out by rapidly mixing an aqueous halogen salt solution and an aqueous silver salt solution by supplying the same to the mixer, which is rotating at high speed, via supply pipes from the upper and lower free ends. When there is an upper and lower partition disc, the aqueous halogen salt solution and the aqueous silver salt solution supplied to the two, upper and lower, chambers are respectively diluted by the aqueous colloidal solutions filling each chamber and the reaction is effected by rapid mixing in the vicinity of the outlet slits of the mixer. Growth is carried out by venting the silver halide grains produced using the centrifugal force generated by the rotation of the mixer into the aqueous colloidal solution in the reaction vessel. However, with these methods, it is not possible to fully resolve the problem of the nonuniformity of the silver iodide distribution, and the silver iodide exhibits a non-uniform distribution. A year-ring-shaped striped pattern is clearly observed using a cooled transmission electron microscope.

On the other hand, a technique for preventing non-uniform growth which improves the localized concentration imbalance is disclosed in JP-B-55-10545. This method involves a technique whereby the aqueous halogen salt solution and the aqueous silver salt solution are separately supplied via supply tubes from the lower end portion in a mixer filled on its inside with an aqueous colloidal solution in a reaction vessel filled with an aqueous colloidal solution. Silver halide growth is carried out with the said reaction solutions by vigorously stirring and mixing the two reaction solutions by means of a lower portion stirring vane (turbine blade) provided in the mixer. The silver halide grains which have been grown are then immediately vented from openings in the upper mixer into the aqueous colloidal solution in the reaction vessel by means of an upper portion stirring vane provided above the abovementioned stirring vane.

Nevertheless, it is not possible to completely resolve the problem of the nonuniformity of the silver halide distribution with this method either, and year-ring-shaped striped patterns which indicate the non-uniform distribution of the silver iodide are clearly discerned. Further, a similar technique is also disclosed in JP-A-57-92523, but it has not been possible to completely resolve the problem of the non-uniform silver iodide distribution with this method either.

There is a disclosure of a photographic element containing tabular silver halide grains of silver iodobromide and silver bromide with an average diameter range of 0.2 to 0.55 μm in JP-A-62-115435 and with an aspect ratio of 8 or more and an average diameter range of 0.4 to 0.55 μm in JP-A-62-99751. Regarding the growth of tabular silver iodobromide grains in the embodiments thereof, there is disclosed a technique for growing tabular silver iodobromide grains by using a double jet to add an aqueous silver nitrate solution and an aqueous potassium bromide solution to a reaction vessel in the presence of a protective colloid (bone gelatin), the iodine being supplied by the simultaneous addition of a silver iodide (AgI) emulsion (grain size of about 0.05 μm, bone gelatin 40 g/Ag mol).

However, the problem of a non-uniform silver iodide distribution is not completely resolved with this method either, and a year-ring-shaped striped pattern which indicates a non-uniform silver iodide distribution is clearly observed.

Thus, it is clear that it is not possible to realise a completely uniform silver iodide distribution using the techniques employed hitherto. As a result of diligent study, the present inventors have discovered that the year-ring-shaped striped pattern completely disappears and a completely uniform silver iodide distribution is obtained by growing the silver halide grains using a silver halide supply in the form of fine silver halide particles having the intended halide composition without any addition whatsoever to the reaction vessel of aqueous solutions of the silver ions and halide ions (iodide ions and bromide ions or chloride ions) for grain formation. This result was not achievable with conventional methods, and furtheremore provides results that are unexpected. Specific methods for supplying the fine silver halide particles include:

(1) Method for the addition of fine-grained emulsions containing silver iodide previously prepared.

An emulsion containing fine silver halide grains (silver iodobromide, silver chloroiodobromide, silver iodochloride) having the same silver iodide content as that of the intended silver halide grains is prepared in advance. The silver halide grains are grown by supplying only this fine-grain emulsion to the reaction vessel with absolutely no supply of aqueous solutions of water-soluble silver salts and aqueous water-soluble halide solutions.

(2) Method for supplying fine silver halide grains from a mixer outside of the reaction vessel.

As a method for supplying fine grains effectively, a strong and effective mixer is provided outside the reaction vessel, an aqueous solution of water-soluble silver salts, an aqueous solution of water-soluble halides and an aqueous solution of a protective colloid are supplied to this mixer and rapidly mixed to produce extremely fine silver halide grains, whereupon these are immediately and continuously supplied to the reaction vessel. In this case, there is absolutely no supply of the aqueous solution of water-soluble silver salts or the aqueous solution of water-soluble halogen salts to the reaction vessel in the same manner as in the method (1). U.S. Pat. No. 2,146,938 discloses a method for growing coarse-grained emulsions by mixing coarse grains on which no adsorbent substance is adsorbed and similarly fine grains on which no adsorbent substance is adsorbed, or by slowly adding a fine-grained emulsion to a coarse-grained emulsion. The silver iodide content of the fine grains is not specifically set forth in U.S. Patent 2,146,938, but the silver iodide content in the embodiments is not greater than 2.6 mol %. JP-A-57-23932 discloses a method for grain growth by dissolving the fine grains in which a fine-grained emulsion which has been prepared in the presence of a growth inhibitor is washed by decantation and redispersed, and the emulsion is further dissolved and added to the emulsion which is to be grown.

This method would certainly be preferable in that fine grains of a smaller size are obtained, but the redissolution of the fine grains in the reaction vessel is most probably impaired by the growth inhibitor. Furthermore, in these patents there is no mention of fine-grained halogen compositions, and in the embodiments there are only descriptions of fine-grains of pure silver bromide. These grains are entirely different to the present invention which relates to the growth of silver halide grains containing silver iodide.

U.S. Pat. Nos. 3,317,322 and 3,206,313 disclose method for preparing a silver halide emulsion having a high internal speed by mixing an emulsion of non-chemically sensitized silver halide grains with an average grain size of 0 4 μm or less, with an emulsion of chemically sensitized silver halide grains having an average grain size of at least 0.8 μm which constitute the core, and then forming a shell by ripening.

This method relates to a production method for internal latent image forming grains having a high internal speed. Additionally, the disclosure refers only to specific examples in which the silver iodide content during shell formation is 2 mol % or less. This method entirely different from the formation of a microscopically uniform phase of the present invention which relates to surface latent image forming silver halide grains. The specification of JP-A-58-113927 (p. 207) states "Fine silver halides in which a bromide and an iodide salt are suspended in a dispersant may be introduced at the outset or in the growth stage. Thus, it is possible to introduce silver bromide, silver iodide and/or silver iodobromide grains". However, there is no disclosure of growth of silver halide grains using only a supply of fine-grain emulsions with absolutely no supply of aqueous silver salt and halide salt solutions, and there is no disclosure of a specific method. In JP-A-62-124500, there is a description of an embodiment in which host grains are grown in a reaction vessel using previously prepared very fine grains (approximately 0.02 μm), but the fine grains used were silver bromide, which is entirely different from the present invention.

The details of the respective methods are described below.

Method (1)

With this method, tabular grains constituting the nucleus or core are already present in the reaction vessel. Grain growth is carried out by then adding an emulsion having fine-sized grains prepared in advance, and effecting what is known as Ostwald ripening to thereby dissolve the fine grains and deposite the silver halide on the nucleus or core. The halide composition of the fine-grain emulsions contains the same silver iodide as the silver iodide content of the intended tabular grains, and this is silver iodobromide, silver chloroiodobromide or silver iodochloride. An average diameter of 0.1 μm or less is preferred, and 0.06 μm or less is most preferred for the grain size of the fine-sized grains. In this invention, the dissolution rate of the fine grains is important, and it is preferable to use a silver halide solvent in order to increase this rate. Useful silver halide solvents include, for example, water-soluble bromide compounds, water-soluble chloride compound, thiocyanates, ammonia, thioethers and thioureas.

In particular, useful silver halide solvents include thiocyanates (e.g. U.S. Pat. Nos. 2,222,262, 2,448,534 and 3,320,069), ammonia and thioether compounds (e.g. U.S. Pat. Nos. 3,271,157, 3,574,628, 3,704,130, 4,297,439 and 4,276,347), thione compounds (e.g. JP-A-53-144319, JP-A-53-82408 and JP-A-55-77737), amine compounds (e.g. JP-A-54-100717), thiourea derivatives (e.g. JP-A-55-2982), imidazoles (e.g. JP-A-54-100717), substituted mercaptotetrazoles (e.g. JP-A-57-202531) and the like.

The temperature for growing the silver halide grains is 50° C. or more, preferably 60° C. or more and more preferably 70° C. or more. Furthermore, the fine-grain emulsion may be added at one time, or it may be added in portions during the crystal growth, but the fine-grain emulsion is preferably supplied at a fixed flow rate, and more preferably, the rate of addition is increased over time. In this case, the way in which the rate of addition is increased will be determined in relation to the coexisting colloid concentration, the silver halide crystal solubility, the size of the fine silver halide grains, the degree of stirring in the reaction vessel, the size and concentration of the grains present at each moment, the hydrogen ion concentration (pH) and the silver ion concentration (pAg) in the aqueous solutions in the reaction vessel and the size of the intended crystal grains and their distribution. Such parameters are readily determined without undue experimentation.

Method (2)

As discussed above, the crystal growth method for use in the present invention does not involve the supply of silver ions and halide ions (including iodide ions) necessary for silver halide crystal growth by adding aqueous solutions of the same as is conventionally done, but involves growing silver halide grains by adding fine silver halide crystals and instigating Ostwald ripening to make use of the high solubility of the fine grains. The growth limiting step of this method is not the growth rate of the silver halide grains, but is the fine grain dissolution rate and the supply rate of the silver ions and halide ions to the reaction vessel. In cases as in Method (1) where the fine-grain emulsions are prepared in advance, it is desirable to have grains which are of as small a size as possible, but on the other hand, the smaller the size of the silver halide grains, the greater their solubility. The smaller grains become extremely unstable, and the fine grains themselves immediately instigate Ostwald ripening, which brings about an increase in the grain size.

In the fourth edition of *The Theory of the Photographic Process*, by T. H. James, Lippmann emulsions are cited as fine grains, and their average size is described as being 0.05 μm. It is possible to obtain fine grains having a grain size of 0.05 μm or less, but even if they are obtained, they are unstable, and the grain size readily increases due to Ostwald ripening. Such Ostwald ripening is to some extent prevented if adsorbent substances are made to adsorb on the grains, but the solution rate is decreased to an extent which is counter to the objectives of the present invention.

This problem is resolved in the present invention by the following three techniques.

(i) After forming the fine grains in the mixer, the fine grains are immediately added to the reaction vessel.

After previously forming fine grains to obtain a fine-grain emulsion, this is redissolved and grain growth is effected by adding the dissolved fine grain emulsion to a reaction vessel in which a silver halide solvent is present, and which holds silver halide grains which constitute nuclei as described in (1). However, once they have been produced, the extremely fine grains initiates Ostwald ripening in the grain formation stage, washing stage, redispersion stage and re-dissolution stage, to thereby increase their grain size. In this method, Ostwald ripening is not initiated due to the fact that the mixer is physically located extremely close to the reaction vessel, and the residence time for the solutions added to the mixer is extremely short. The fine grains which are produced are then added immediately to the reaction vessel. More specifically, the residence time t for the solutions added to the mixer is represented as follows.

$$t = \frac{V}{a + b + g}$$

V: Volume of the reaction chamber of the mixer (ml)
a: Amount of silver nitrate solution added (ml/min)
b: Amount of halogen salt solution added (ml/min)
c: Amount of protective colloid solution added (ml/min)

In the production method of the present invention, t is 10 minutes or less, preferably 5 minutes or less, more preferably 1 minute or less and most preferably 20 seconds or less. The fine grains obtained in the mixer in this manner are added immediately to the reaction vessel without an increase in grain size.

(ii) Strong and effective stirring is carried out in the mixer.

It is stated on p. 93 in the fourth edition of *The Theory of the Photographic Process by T. H. James "Another form in addition to Ostwald ripening is coalescence. With Ostwald ripening the grain size changes suddenly since the crystals which were previously widely separated fuse and coalesce directly thereby producing larger crystals. Both Ostwald ripening and coalescence ripening occur not only after the completion of deposition but also during deposition". The coalescence ripening referred to readily occurs when the grain size is extremely small, and readily occurs when there is insufficient stirring in particular. In extreme cases, there is even the production of coarse lump-like grains. In the present invention, since use is made of a tightly closed mixer as shown in FIG. 1, it is possible to rotate the stirring vane of the reaction chamber at a high rotational speed and to carry out a powerful and effective mixing which was not possible using conventional open reaction vessels. For the open models, this aggresive mixing was not practicable since the solutions were scattered by the centrifugal force when the stirring vane was rotated at a high rotational speed, and there was also the problem of foaming. The above-noted coalescence ripening is thus prevented, and as a result fine grains are obtained having*

*an extremely small grain size. The rotational speed of the stirring vane in the present invention is* 1,000 rpm or more, preferably 2,000 rpm or more and more preferably 3,000 rpm or more.

(iii) Injection of an aqueous protective colloid solution into the mixer

The above-noted coalescence ripening may be prevented to a marked degree using a protective colloid for the fine silver halide grains. In the present invention, the addition of the aqueous protective colloid solution to the mixer is performed by one of the following methods:

(a) Injection of the aqueous hydrophilic colloid solution into the mixer alone.

The protective colloid concentration is 1% by weight or more and preferably 2% by weight, and the flow rate is at least 20%, preferably at least 50% and more preferably 100% or more of the total of the flow rate of the silver nitrate solution and the aqueous halogen salt solution.

(b) Inclusion of the protective colloid in the aqueous halogen salt solution.

The protective colloid concentration is 1% by weight or greater, and preferably 2% by weight or greater.

(c) Inclusion of the protective colloid in the aqueous silver nitrate solution.

The protective colloid concentration is 1% by weight or greater, and preferably 2% by weight or greater. When gelatin is used, gelatin silver is produced by the gelatin and silver ions, and a silver colloid is produced by photodecomposition and thermal decomposition. It is therefore better to mix the silver nitrate solution and the protective colloid solution immediately before use.

Additionally, the methods of (a) to (c) described above may respectively be used singly, or in combination, or the three methods may be used simultaneously. Gelatin is useful as the protective colloid for use in the present invention, but it is possible to use other hydrophilic colloids, specifically those described in *Research Disclosure,* Vol. 176, No. 17643 Item IX (December 1978).

The grain size of fine grains obtained using the techniques of (i) to (iii) in this way may be determined by mounting the grains on a mesh, and using a transmission electron microscope at a magnification of 20,000 to 40,000 when the grains in this state. The size of the fine grains for use in the present invention is 0.06 μm or less, preferably 0.03 μm or less and more preferably 0.01 μm or less.

In this manner, the reaction vessel is supplied with grains of an extremely fine size, and a higher solution rate for the fine grains is obtained and therefore, a higher growth rate results for the silver halide grains in the reaction vessel. With this method, the use of a silver halide solvent is not essential, but a silver halide solvent may be used in order to obtain a higher growth rate, or otherwise as required. The silver halide solvent is as described in Method (1). According to this method, it is possible to freely control the supply rate of silver ions and halide ions into the reaction vessel. A fixed supply rate is acceptable, but it is preferable to increase the rate of addition. This method is described in JP-B-48-36890 and JP-B-52-16364. Other factors are as discussed in Method (1). Furthermore, the halogen composition may be freely controlled during growth with this method, and, for example, a fixed silver iodide content may be maintained during the growth of tabular grains, the silver iodide content may be continuously increased or decreased, or the silver iodide content may be changed at a given time.

The reaction temperature in the mixer is 60° C. or less, preferably 50° C. or less and more preferably 40° C. or less. At a reaction temperature of 35° C. or less, it is preferable to use gelatin of a low molecular weight (average molecular weight 30,000 or less), since coagulation readily occurs with normal gelatin.

3. Introduction of the dislocation line phase

There are silver halide grains with a uniform phase in Japanese patent Application No. 63-7853, but with the method described below, it has been discovered that the speed is raised, even when the developing time is shortened, by the introduction of a phase having 5 or more dislocation lines.

To introduce the dislocation line phase, the method described in JP-A-63-220238 (correspondig to U.S. patent application Ser. No. 07/165,085 filed Mar. 7, 1988) may be applied.

Thus, dislocation in tabular grains can be observed by a direct method using a low-temperature transmission electron microscope as described in, for example, *Phot. Sci. Eng.,* by J. F. Hamilton, 11, 57, (1967) and in *J. Soc. Phot. Sci. Japan,* 35, 213, (1972). In other words, silver halide grains, which have been extracted from an emulsion taking case not to apply a pressure sufficient to cause dislocation in the grain, are mounted on an electron microscope observation mesh. Observations are carried out by the transmission method with the sample cooled in such a way as to prevent damage (printout or the like) from the electron beam. At this time, a clearer observation is made possible by the use of a high-voltage electron microscope (200 kV or more for grains having a thickness of 0.25μ) since the electron beam is harder to transmit with a thicker grain. Using this method, the resulting photograph of the grain may be used to determine the position and number of dislocations in each grain when viewed from a direction perpendicular to the principle plane.

The dislocation positions in the grains of the present invention occur at the region over a distance from the center of x % based on the distance between the center and the edge in the long-axis orientation of a tabular grain. The value for x is preferably $10 \leqq x < 100$, more preferably $30 \leqq x < 98$, and most preferably $50x < 95$. At such times, the pattern produced by joining the starting positions of the dislocations is closely similar to the grain form, but this is not a completely similar form and there will be distortions. The direction of the dislocation lines will roughly be in a direction from center to edge, but this direction will often meander.

Regarding the number of dislocations in the tabular grains of the present invention, it is preferable that grains containing 5 or more dislocations are present to an extent of not less than 50% (by number) based on the total number of the emulsion grains having a silver halide phase having a completely uniform silver iodide distribution. More preferably, grains containing 10 or more dislocations are present to an extent of not less than 80% (by number), and particularly preferably grains containing 20 or more dislocations are present to an extent of not less than 80% (by number).

A production method for tabular grains is described below.

A production method for tabular grains may comprise a suitable combination of methods which are known in the industry.

To produce a phase containing 5 or more dislocation lines, an iodide compound is added in an amount of from 10 to 99 mol % with respect to the total amount of $Ag^+$ ions added. This amount is preferably from 20 to 95 mol % and more preferably from 60 to 90 mol %. Inorganic salts such as KI and NaI are preferred as the iodide compound.

The iodide compound may also be added in a state wherein other halogen ions have been added, but it is preferable to add only an iodide compound. Furthermore, after the addition of the iodide compound is complete, it is preferable to leave an interval of 10 seconds or more, and preferably 30 seconds or more, before the addition of the halogen ions is begun. The addition of the iodide compound is preferably carried out as rapidly as possible, and within 5 minutes is preferred.

The temperature at which the iodide compound is added may vary, but is preferably 30° to 80° C. The iodide compound added is 0.005 to 20 mol %, and preferably 0.01 to 10 mol % of the total silver halide amount.

The multilayer structure grains having an external high silver iodide phase are grains wherein, when the point at which halogen exchange has been carried out with an iodide compound is taken as the boundary, the average iodide content of the silver halide phase outside of this boundary is higher than the average iodide content of the silver halide phase inside the boundary preferably by a factor of 2 times or more. Furthermore, the silver iodide content of each phase may be examined by an analytical electromicroscope.

Using the silver halide emulsion of the present invention, photographic materials can be prepared in a conventional manner.

The silver halide grains of the photographic emulsion for use in the photographic material of the present invention may have a cubic, octahedral, rhombic dodecahedral, tetradecahedral or other such regular crystal form; or a spherical, tabular or other such irregular crystal form; or may have a complex form of these crystal forms. In addition, the silver halide grains may be tabular grains having an aspect ratio of 5 or more as described in *Research Disclosure,* Vol. 225, pp. 20 to 58 (January 1983).

In addition, the silver halide grains of the present invention may have an epitaxial structure, or a multilayer structure in which the inside and the surface of the grain are of different halogen composition.

Furthermore, the grain size distribution may be broad or narrow. In the latter, this distribution is known as a "monodisperse" emulsion, and the dispersion coefficient may be 20% or less and is preferably 15% or less. As used herein, the dispersion coefficient is the standard deviation divided by the average grain size.

The photographic emulsions can be prepared using the methods described, for example, in *Chimie et Physique Photographique* by P. Glafkides (Paul Montel, 1967), *Photographic Emulsion Chemistry* by G. F. Duffin (The Focal Press, 1966), and in *Making and Coating Photographic Emulsion* by V. L. Zelikman (The Focal Press, 1964). Thus, any of the acidic method, neutral method, ammonia method or the like may be used, and the one-sided mixing method, simultaneous mixing method or a combination thereof may be used as the system for reacting the soluble silver salts with the soluble halogen salts.

These photographic emulsions may be combinations of any of the following: silver iodobromide, silver iodochlorobromide and silver iodochloride.

Furthermore, the coated silver amount in the photographic material of the present invention is preferably 1 to 20 g/m$^2$, and particularly preferably 2 to 10 g/m$^2$.

Furthermore, the total amount of iodide (AgI) contained in the silver halide photographic material is preferably $2\times10^{-3}$ mol/m$^2$ or more. More preferably, it is from $6\times10^{-3}$ mol/m$^2$ to $4\times10^{-2}$ mol/m$^2$.

Cadmium salts, zinc salts, lead salts, thallium salts, iridium salts or complex salts thereof, rhodium salts or complex salts thereof, iron salts or complex salts thereof and the like may be present during the silver halide grain formation or physical ripening stage.

By way of binders for the emulsion layers and other layers of the silver halide photographic material of the present invention, proteins such as gelatin and casein; cellulose compounds such as carboxymethylcellulose and hydroxyethylcellulose; saccharide derivatives such as agar, dextran, sodium alginate and starch derivatives; synthetic hydrophilic colloids such as polyvinyl alcohol, poly-N-vinylpyrrolidine, polyacrylic acid copolymers, polyacrylamide and derivatives and partially hydrolyzed products thereof may be used.

Gelatin as referred to herein means lime-treated gelatin, acid-treated gelatin or enzyme-treated gelatin.

The photographic structural layers of the photographic material of the present invention may contain alkylacrylate-based latexes as described, for example, in U.S. Pat. Nos. 3,411,911, 3,411,912 and JP-B-45-5331.

A polymer capable of providing cationic sites in a fixing solution may be added to both photosensitive layers and non-photosensitive layers, but it is preferable to provide a non-photosensitive layer between the photosensitive layers and the support, and to add the polymer to this intermediate layer. Of polymers providing cationic sites, those having a high iodide ion trapping potential are preferred. The amount of the polymer added is preferably 0.1 or more, more preferably 0.3 to 100 and even more preferably 0.5 to 30 in units of the cation sites with respect to 1 mole of the amount of all the iodide in the photographic material.

It is preferable that the emulsions for use in the photosensitive silver halide emulsion layers of the present invention be chemically sensitized.

For the chemical sensitization, the method described in the above-noted writings of Glafkides or Zelikman or in "Die Grundlagen der photographischen Prozesse mit Silberhalogeniden" (The Fundamentals of Photographic Processes with Silver Halides) edited by H. Frieser (Akademische Verlagsgesellschaft, 1968) are useful.

Thus, either singly or in combination, a sulfur sensitization method employing active gelatin and a compound containing sulfur able to react with silver ions, a reduction sensitization process employing a reducing substance, or a noble-metal sensitization process employing a gold or other such noble-metal compound may be used. As sulfur sensitizations, thiosulfates, thioureas, thiazoles, thiocyanates and other such compounds may be used. As reduction sensitizers, stannous salts, amines, hydrazine derivatives, formamidinesulfinic acid, silane compounds and the like may be used. For the noble-metal sensitization, in addition to complex gold salts, complex salts of metals in Group VIII of the Periodic Table such as platinum, iridium and paladium may be used.

Various compounds may be included in the photographic material of the present invention such as stabilizers. Thus, many compounds which are known as stabilizers may be added; for example, azoles such as benzothiazolium salts, nitroindazoles, triazoles, benzotriazoles, benzimidazoles (in particular, nitro- or halogen substituted compounds); heterocyclic mercapto compounds such as mercaptothiazoles, mercaptobenzothiazoles, mercaptobenzimidazoles, mercaptothiadiazoles, mercaptotetrazoles (in particular, 1-phenyl-5-mercaptotetrazole), mercaptopyridines; the above-noted heterocyclic mercapto compounds having a water-soluble group such as a carboxyl group or sulfo group; thioketo compounds such as oxazolinethione; azaindenes such as tetraazaindenes (in particular, 4-hydroxy-substituted (1,3,3a,7)tetraazaindenes); benzenethiosulfonates; and benzenesulfinates.

The photographic emulsion layers and other structural layers of the photographic material of the present invention may contain surfactants for various purposes such as for auxiliary for coating, static prevention, improving slip properties, emulsification dispersion, preventing sticking and improving photographic characteristics (for example, development acceleration, increasing gradation and sensitization).

For example, nonionic surfactants may be used such as saponin (steroid-type), alkylene oxide derivatives (for example, polyethylene glycol, polyethylene glycol/-polypropylene glycol condensates, polyethylene glycol alkyl ethers or polyethylene glycol alkylaryl ethers, polyethylene glycol esters, polyethylene glycol sorbitan esters, polyalkylene glycol alkylamides or amides, or polyethylene oxide adducts of silicones), glycidol derivatives (for example, alkenyl succinate polyglyceride and alkylphenol polyglyceride), fatty acid esters of polyhydric alcohols and alkyl esters of sugars; anionic surfactants which contain acidic groups such as carboxyl group, sulfo group, phospho group, sulfuric acid ester group or phosphoric acid ester group such as alkyl carboxylates, alkyl sulfonates, alkylbenzenesulfonates, alkylnaphthalenesulfonates, alkyl sulfate esters, alkyl phosphate esters, N-acyl-N-alkyl taurines, sulfosuccinic acid esters, sulfoalkylpolyoxyethylene alkylphenyl eters, polyoxyethylene alkylphosphate esters; amphoteric surfactants such as amino acids, aminoalkylsulfonates, aminoalkyl sulfuric acid or phosphoric acid esters, alkylbetains and amine oxides; and cationic surfactants such as alkylamines, aliphatic or aromatic quaternary ammonium salts, pyridinium, imidazolium and other such heterocyclic quaternary ammonium salts and phosphonium or sulfonium salts containing aliphatic or aromatic rings. On these surfactants, the polyoxyethylene-based surfactants and fluorine-containing surfactants are preferred.

The polyoxyethylene-based surfactants for use in the present invention are preferably those having at least 2, and more preferably 2 to 100, oxyethylene groups.

The surfactants represented by formulae (I-1), (I-2) and (I-3) are preferred as the polyoxyethylene-based surfactants.

$$R_1A(CH_2CH_2O)_{n1}R_2 \quad \text{(I-1)}$$

-continued

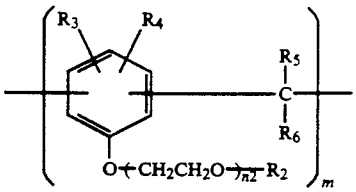

(I-2)

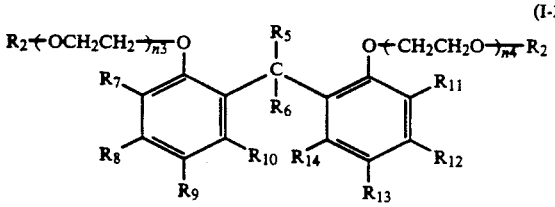

(I-3)

wherien $R_1$ represents a hydrogen atom or a substituted or unsubstituted alkyl group, alkenyl group or aryl group having up to 30 carbon atoms, and A represents —O—, —S—, —COO—, $$-\underset{|}{N}-R_{15},\ -CO-\underset{|}{N}-R_{15},$$

or $-SO_2N-R_{15}$ and wherein $R_{15}$ represents a hydrogen atom or substituted or unsubstituted alkyl group; $R_2$ has the same meaning as $R_1$ or $R_1$—A—; $R_3$, $R_4$, $R_8$, $R_{10}$, $R_{12}$ and $R_{14}$ each represents a hydrogen atom, substituted or unsubstituted alkyl group, aryl group, alkoxy group, halogen atom, acyl group, amido group, sulfonamido group, carbamoyl group or a sulfamoyl group; $R_7$, $R_9$, $R_{11}$ and $R_{13}$ each represents a substituted or unsubstituted alkyl group, aryl group, alkoxy group, halogen atom, acyl group, amido group, sulfonamido group, carbamoyl group or a sulfamoyl group; $R_5$ and $R_6$ each represents a hydrogen atom, substituted or unsubstituted alkyl group, aryl group or heterocyclic aromatic ring; n1, n2, n3 and n4 represent the average degree of polymerization for ethylene oxide, and are numbers of from 2 to 100; and m is the average degree of polymerization, and is from 5 to 50.

$R_5$ and $R_6$, $R_7$ and $R_8$, $R_9$ and $R_{10}$, $R_{11}$ and $R_{12}$, and $R_{13}$ and $R_{14}$ may combine to form a substituted or unsubstituted ring.

Specific nonlimiting examples of the polyoxyethyelne-based compound for use in the present invention are given below.

$$C_{11}H_{23}COO(CH_2CH_2O)_8H \quad \text{I-1}$$

$$C_{15}H_{31}COO(CH_2CH_2O)_{15}H \quad \text{I-2}$$

$$C_{17}H_{33}COO(CH_2CH_2O)_{15}CH_3 \quad \text{I-3}$$

$$C_{18}H_{35}O(CH_2CH_2O)_{20}H \quad \text{I-4}$$

$$C_{12}H_{25}O(CH_2CH_2O)_{10}H \quad \text{I-5}$$

$$C_{16}H_{33}O(CH_2CH_2O)_{23}H \quad \text{I-6}$$

I-7

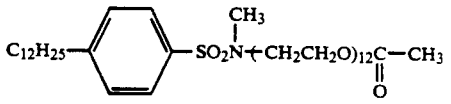

-continued

I-8

$C_{22}H_{45}O(CH_2CH_2O)_{25}H$

I-9

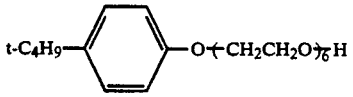

I-10

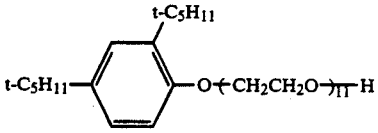

I-11

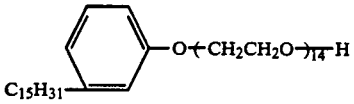

I-12

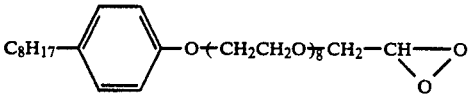

I-13

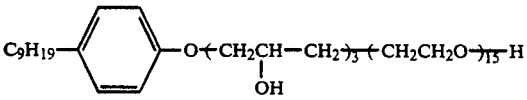

-continued

I-14

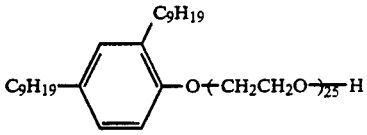

I-15

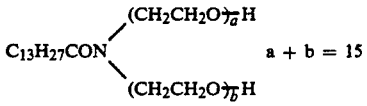

While the amount of the polyoxyethylene-based surfactant for use in the present invention varies depending on the type and form of photographic material and the coating method employed, the amount is generally 6.0 mg or more, and is preferably 60 mg or more per mole of silver in the photographic material.

It is preferable to add the polyoxyethylene-based surfactant to a photosensitive emulsion layer but the surfactant may also be added to a non-photosensitive layer layer.

The photographic material of the present invention may contain a dye having an absorption in the visible region.

Preferably 80% or more of all the dyes are included in layers closer to the support than he photosensitive layer. More preferably, it is preferably to include 80% or more of all the dyes in the same layer containing the polymer capable of providing cationic sites.

Nonlimiting examples of dyes for use in the present invention are given below.

1

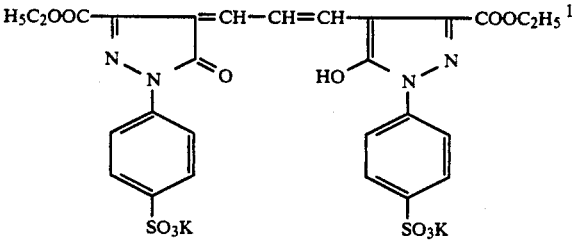

2

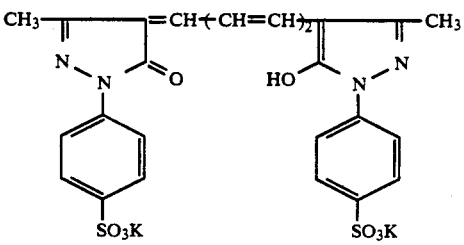

3

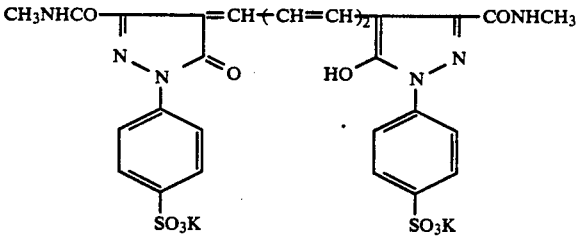

4

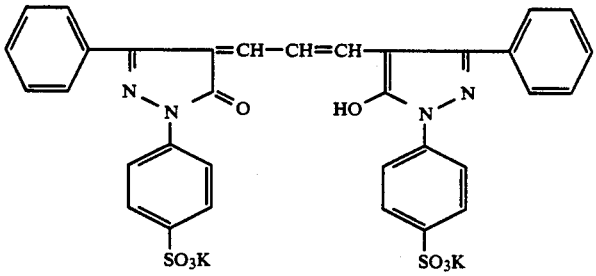

-continued
5
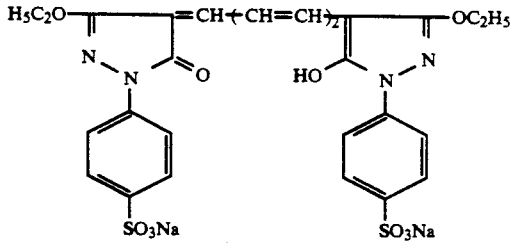
6
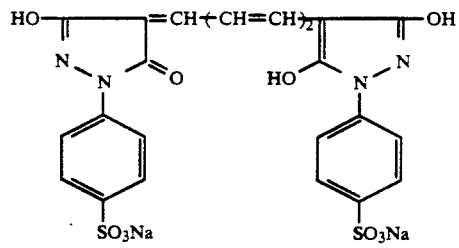
7
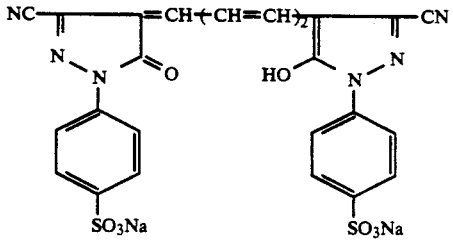
8
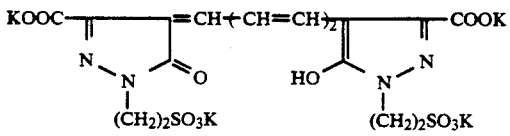
9
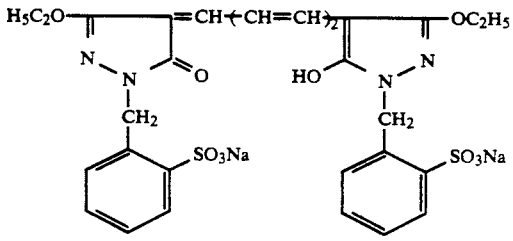
10
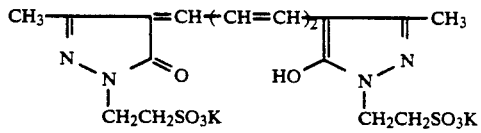
11
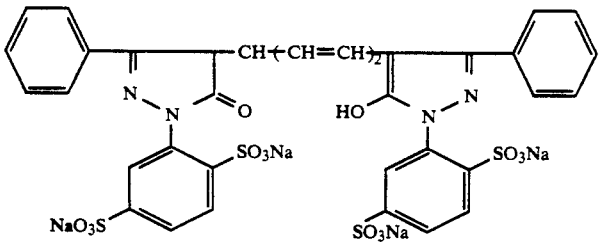
12
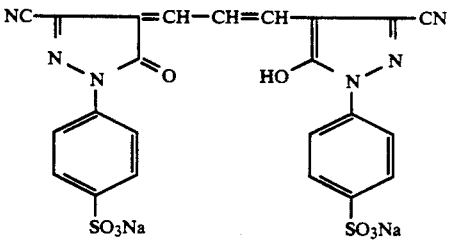
13
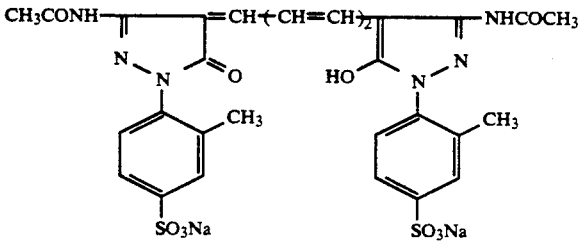

-continued
14
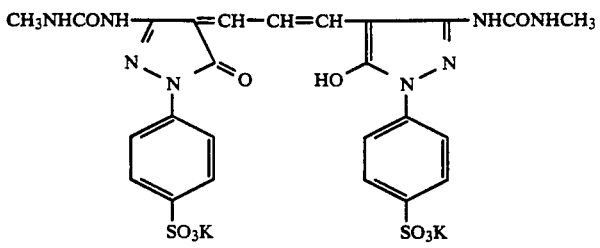
15
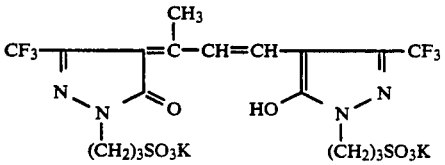
16
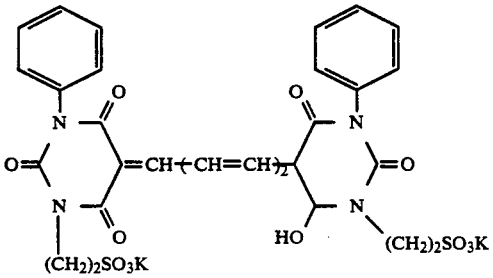
17
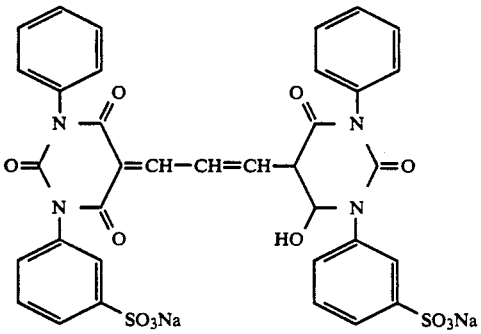
18
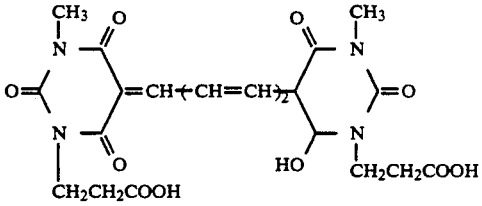
19
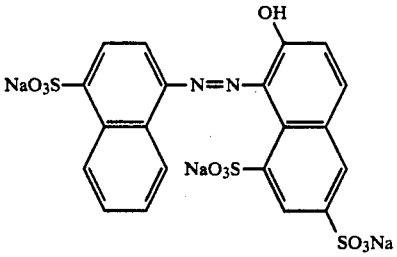
20
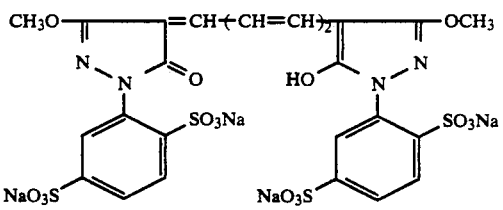
21
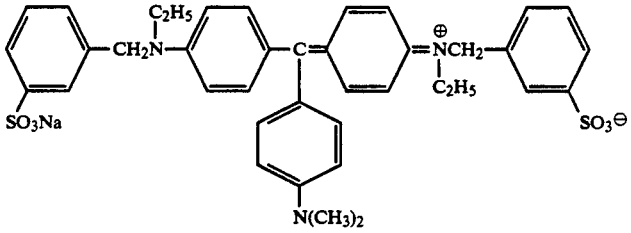
22
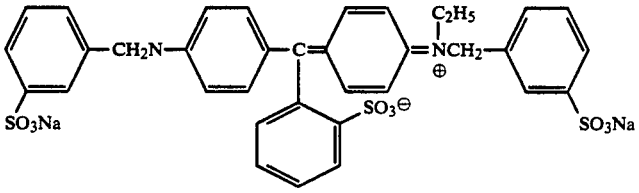

-continued
23
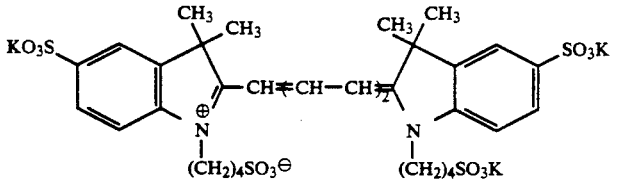
24
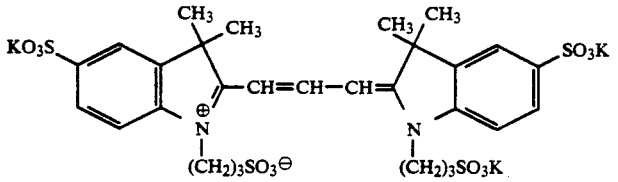
25
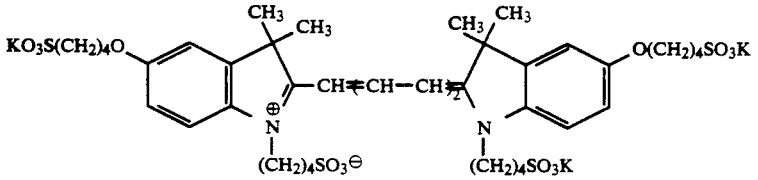
26
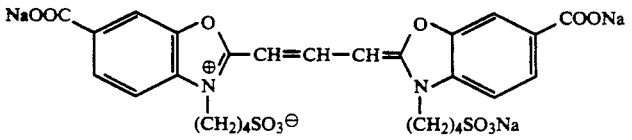
27
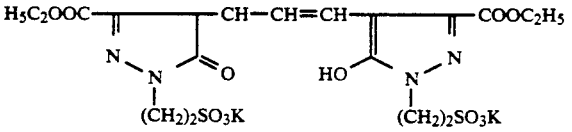
28
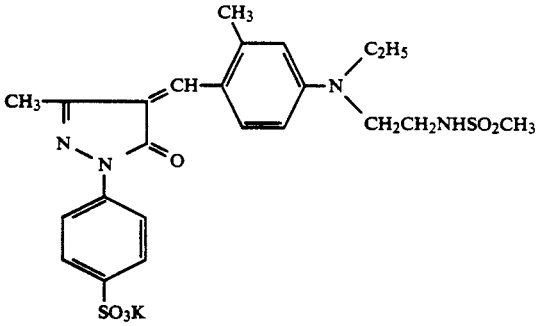
29
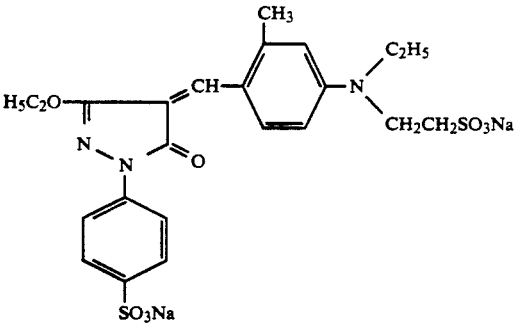
30
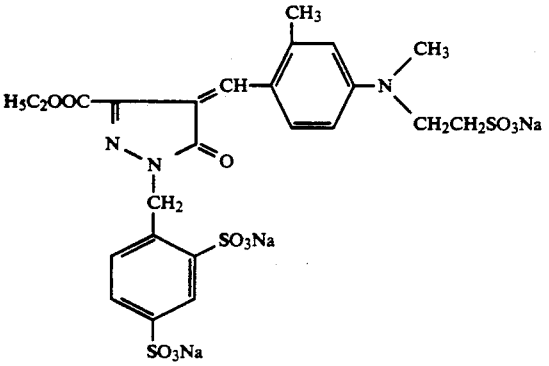
31
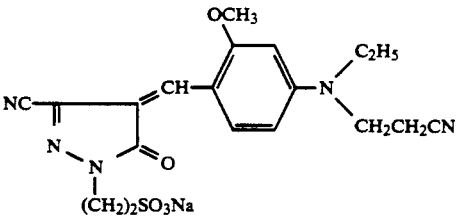

-continued

32

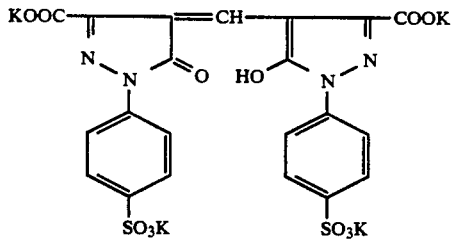

33

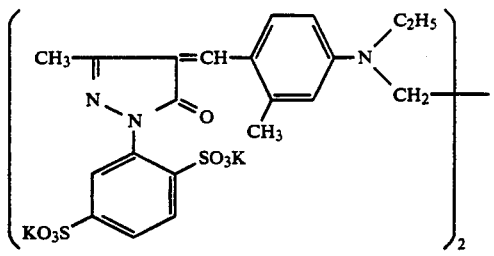

34

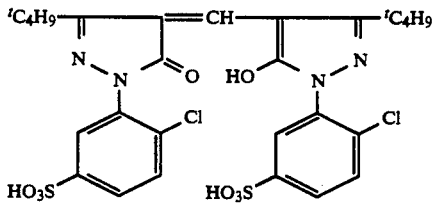

The compounds described, for example, in JP-B-59-7724, JP-B-57-53933, Japanese Patent Application No. 61-61208 and U.S. Pat. No. 3,022,172 can be added to the photographic material of the present invention for the purpose of improving the viscosity of the coating solution. In particular, a water-soluble polymer such as polystyrene sulfonate or poly-3,3-acrylamido-methylpropane sulfonate is preferably used.

The photographic emulsions and the non-photosensitive hydrophilic colloids of the present invention may include inorganic or organic film harderners. For example, either singly or in combination, chromium salts, aldehydes (for example, formaldehyde and glutaraldehyde), N-methylol compounds (for example, dimethylolurea), active vinyl compounds (for example, 1,3,5-triacryloylhexahydro-s-triazine, bis(vinylsulfonyl)-methyl ether, N,N'-methylenebis[(β-vinylsulfonyl)propionamide]), active halogen compounds (for example, 2,4-dichloro-6-hydroxy-s-triazine), mucohalic acids (for example, mucochloric acid), N-carbamoylpyridinium salts (for example, (1-morpholinocarbonyl-3-pyridinio) methanesulfonate), and haloamidinium salts (for example, 1-(1-chloro-1-pyridinomethylene)pyrrolidinium and 2-naphthalene sulfonate) may be used. Of these, the active vinyl compounds described in JP-A-53-41220, JP-A-53-57257, JP-A-59-162546 and JP-A-60-80846 and active halogen compounds described in U.S. Pat. No. 3,325,287 are preferred.

The photographic emulsions of the present invention may be spectrally sensitized by means of a methine dye or the like. Useful dyes include cyanine dyes, merocyanine dyes, complex cyanine dyes, complex merocyanine dyes, holopolar cyanine dyes, hemicyanine dyes, styryl dyes and hemioxonol dyes. Particularly effective are the cyanine dyes, merocyanine dyes and complex merocyanine dyes. In these dyes, any nucleus may be used which is commonly employed in cyanine dyes as a basic heterocyclic ring nucleus. Thus, the pyrroline nucleus, oxazoline nucleus, thiazoline nucleus, pyrrole nucleus, oxazole nucleus, thiazole nucleus, selenazole nucleus, imidazole nucleus, tetrazole nucleus, pyridine nucleus and the like; nuclei in which alicyclic hydrocarbon rings have been fused onto these nuclei; nuclei in which aromatic hydrocarbon rings have been fused onto these nuclei may be used. In other words, the indolenine nucleus, benzindolenine nucleus, indole nucleus, benzoxazole nucleus, naphthoxazole nucleus, benzothiazole nucleus, naphthothiazole nucleus, benzoselenazole nucleus, benzimidazole nucleus, quinoline nucleus and the like may be used. The nuclei may be substituted at a carbon atom member.

By way of nuclei having a keto methylene structure in the merocyanine dye or complex merocyanine dye, a 5- or 6-membered heterocyclic nucleus may be used such as the pyrazolin-5-one nucleus, thiohydantoin nucleus, 2-thiooxazolidine-2,4-dione nucleus, thiazolidine-2,4-dione nucleus, rhodanine nucleus and thiobarbituric acid nucleus.

The amount of sensitizing dyes for use in the present invention is preferably $1\times10^{-6}$ to $5\times10^{-3}$ mole per mole of silver.

The photographic emulsion of the present invention may contain color-image-forming couplers, which are compounds (hereinafter couplers) which form a dye by reacting with the oxidation product of an aromatic amine (normally a primary amine) developing agent. It is desirable for the coupler to be of a non-diffusible type having a hydrophobic ballast group. The coupler may be a 4-equivalent or 2-equivalent coupler with respect to silver ion. Furthermore colored couplers which have a color correcting effect, or couplers which release development inhibitors upon developing (i.e., DIR couplers) may also be included. Couplers of the type wherein the product of the coupling reaction is colorless may also be used.

Known open-chain ketomethylene-based couplers may be used as yellow color couplers. Of these, the benzoylacetoanilido-based and pivaloylacetoanilido-based compounds are advantageous.

Pyrazolone compounds, indazolone-based compounds, cyanoacetyl compounds and the like may be used as magenta couplers and the pyrazolone-based compounds are particularly advantageous.

Phenolic compounds and naphtholic compounds and the like may be used as cyan couplers.

A protective layer may be included in the silver halide photographic material of the present invention, and the protective layer is a layer composed of a hydrophilic colloid. The above-note hydrophilic colloids may be used for this purpose. In addition, the protective layer may comprise a single layer or several layers.

A matting agent and/or a slip agent may be added to the protective layer or emulsion layers, and preferably to the protective layer, of the silver halide photographic material of the present invention. As the matting agent, preferential use is made of polymethyl methacrylate having a suitable particle size (i.e., a particle size of 0.3 to 5 μ, or a particle size that is twice, particularly four times, as great as the thickness of the protective layer) or other such water-dispersible vinyl polymer or organic compound, or a silver halide, strontium barium sulfate or other such inorganic compound. In addition to being useful in preventing sticking similar to the matting agent, the slip agent is effective in improving the friction characteristics in relation to camera compatibility particularly when photographing or when projecting cinematographic film. Preferably used slip agents include liquid paraffin, higher fatty acid esters and other such waxes, polyfluoroinated hydrocarbons or derivatives thereof, polyalkyl polysiloxane, polyaryl polysiloxane, polyalkylaryl polysiloxane or alkyleneoxide addition derivatives thereof and other such silicones.

In addition, intermediate layers, filter layers and the like may be provided in the silver halide photographic material of the present invention as required.

The silver halide photographic material of the present invention may be an X-ray material, lithographic photosensitive material, black-and-white photographic photosensitive material, color negative material, color reversal material, color printing paper and the like. Negative materials are preferred. Black-and-white photographic negative materials are particularly preferred.

In addition, various additives may be used in the photographic material of the present invention as required. For example, development accelerators, fluorescent brighteners, anticolor-fogging agents, ultraviolet absorbers and the like may be used. Specifically, the substances described in *Research Disclosure* 176, pp. 28 to 30 (RD-17643, 1978) may be used.

Typical supports for use with the photosensitive material of the present invention include cellulose nitrate films, cellulose acetate films, polyvinyl acetal films, polystyrene films, polyethylene terephthalate films and other polyesters as well as glass, paper, metals and wood.

In addition, reference may be made to the discussion on pp. 28 to 30 of RD-17643 for development processes for the photographic material of the present invention.

Fixing solutions for processing the photographic material of the present invention include Fujifix, Super Fujifix, Fuji DP fix and Superfujifix DP made by the Fuji Photo Film Co. Ltd., the F-6 and Kodak Fixer of the Kodak Company of the U.S.A., Konifix and Konifix rapid made by the Konishiroku Co. as well as Olyfix, Maifix, Niwafix, Nissan rapid fixer-F, Nissan rapid fixer-P, Panfix F, Panfix P, Mairoll F and Oriental QF.

The invention is further explained below with reference to the following nonlimiting examples.

EXAMPLE 1

Preparation of tabular silver iodobromide grains 2.6 liter of a 2.0 wt % gelatin solution containing 0.026 M of potassium bromide was stirred while using the double jet method to add 1,200 ml respectively of a 1.2 M silver nitrate solution and an aqueous halogen salt solution containing 1.08 M of potassium bromide and 0.10 M of potassium iodide over the course of 15 minutes. During this time the gelatin solution was maintained at a temperature of 35° C. Next, the emulsion was washed with a common flocculation method, 30 g of gelatin were added and dissolved, and the mixture was adjusted to pH 6.5, and pAg 8.6. The resulting fine silver iodobromide grains A (silver iodide content 8.4%) had an average particle size of 0.07 μm.

Fine silver iodobromide grains B having a silver iodide content of 11% (average grain size 0.07 μm) were obtained in the same way, except for reducing the amount of potassium iodide.

(i) Preparation of a tabular silver halide emulsion (Emulsion-1)

Starting solutions as shown below were prepared to produce tabular silver halide emulsions.

| | | |
|---|---|---|
| A | $H_2O$ | 950 cc |
| | KBr | 2.8 g |
| | Ossein gelatin | 28 g |
| B | KSCN (2N) | 9 cc |
| C | KI | 2.9 g |
| | $H_2O$ | 4 cc |
| D | $AgNO_3$ | 0.34 g |
| | $H_2O$ to | 8.5 cc |
| E | $AgNO_3$ | 6.3 g |
| | $H_2O$ to | 156.8 cc |
| F | $AgNO_3$ | 144 g |
| | $H_2O$ to | 576 cc |
| G | $AgNO_3$ | 50.8 g |
| | $H_2O$ to | 212 cc |
| H | KBr | 0.47 g |
| | $H_2O$ to | 8.5 cc |
| I | KBr | 1.8 g |
| | $H_2O$ to | 156.8 cc |
| J | KBr | 97 g |
| | KI | 11.8 g |
| | $H_2O$ to | 576 cc |
| K | KBr | 30.4 g |
| | $H_2O$ | 97 cc |

The double jet method was used to add solutions D and H to the solution A stirred at 75° C. After this, the double jet method was similarly used to add solutions E and I over a period of 28 minutes.

Next, solution B was added thereto. Then, solutions F and J were added over a period of 60 minutes gradually increasing the addition rate from 0.96 cc/min at the beginning of the addition. After this, solution C was added, and then solutions G and K were added using the double jet method.

After completing the additions, desalting was carried out by a common method. Next, chemical sensitization was carried out using the gold/sulfur sensitization method using chloroauric acid and sodium thiosulfate, and a photosensitive silver iodobromide emulsion (Emulsion-1) with an iodide content of 8 mol % was obtained. The sensitizing dye-1 was added prior to chemical sensitization.

Sensitizing dye-1

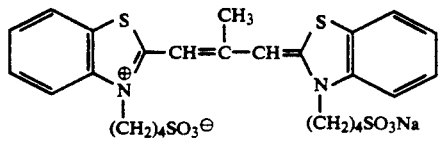

The emulsion grains in Emulsion 1 did not have a phase having a completely uniform silver iodide distribution but exhibited more than 10 dislocation lines.

(ii) Emulsion-2

A silver iodobromide emulsion (Emulsion-2) having an iodide content of 8 mol % and containing emulsion grains having no phase having a completely uniform silver iodide distribution but exhibiting 2 dislocation lines was obtained in the same way as Emulsion-1, except for altering the amount of KBr and KI in solution J and not adding the solution C.

(iii) Emulsion-3

A silver iodobromide emulsion (Emulsion-3) having an iodide content of 6 mol % and containing emulsion grains having no phase having a completely uniform silver iodide distribution but exhibiting 2 dislocation lines was obtained in the same way as Emulsion-1, except for altering the amount of KBr and KI in solution J and avoiding the addition of solution C.

(iv) Emulsion-4

Emulsion-4 (iodide content 8 mol %), a tabular emulsions which did not exhibit a year-ring-like structure and having 10 or more dislocation lines, was obtained in the same way as Emulsion-1, except for adding the fine silver iodobromide grains A over a period of 60 minutes, in place of the solutions F and J.

(v) Emulsion-5

Emulsion-5 (iodide content 8 mol %), a tabular emulsion which did not exhibit a year-ring-like structure or dislocation lines was obtained in the same way as Emulsion-2 except for adding the fine silver iodobromide grains B over a period of 60 minutes in place of the solutions F and J.

(vi) Emulsion-6

Emulsion-6 (iodide content 6 mol %), a tabular emulsion which did not exhibit a year-ring-like structure or dislocation line, was obtained in the same way as Emulsion-3 except for adding the fine silver iodobromide grains A over a period of 60 minutes in place of the solutions F and J.

Preparation of Emulsion X

A tabular silver iodobromide having an average grain size of 1 μ (average iodide content 6 mol %) was prepared by adding potassium bromide, potassium iodide and silver nitrate to an aqueous gelatin solution while stirring vigorously. After this, washing was carried out using a common precipitation method. Next, chemical sensitization was carried out by a gold/sulfur sensitization method using chloroauric acid and sodium thiosulfate to obtain a photosensitive silver iodobromide emulsion X. The sensitizing dye 1 was added prior to chemical sensitization.

The emulsion grains of Emulsion X did not have a phase having a completely uniform silver iodide distribution.

Preparation of coated samples

Samples 1 to 6 were produced by providing the layers below with the following compositions on a triacetyl cellulose support in sequence from the support.

Bottom Layer

Binder: gelatin — 1 g/m²

Fixing accelerator: — 0.16 g/m²

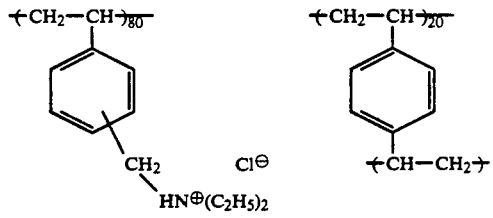

Dyes:

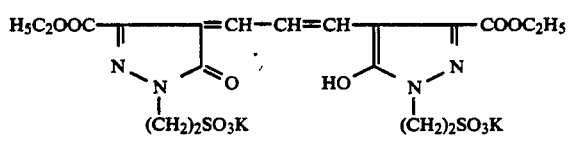

$10^{-4}$ mol/m²

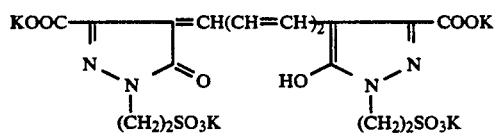

$10^{-4}$ mol/m²

Intermediate layer

Binder: gelatin — 0.4 g/m²

Auxiliary coating agent: potassium poly-p-styrene sulfonate — 8 mg/m²

Emulsion layer 1

Coated silver amount: (Emulsion X) — 1.3 g/m²

Binder: gelatin — 1.9 g/m²

Additive: $C_{18}H_{35}O(CH_2CH_2O)_{20}H$ — 5.8 mg/g.Ag

-continued

| | |
|---|---|
| Auxiliary coating agent: potassium poly-p-styrene sulfonate | 0.2 mg/m$^2$ |
| Emulsion layer 2 | |
| Coated silver amount: (emulsion specified in Table 1) | 4.2 g/m$^2$ |
| Binder: gelatin | 7.8 g/m$^2$ |
| Additive: $C_{18}H_{35}O(CH_2CH_2O)_{20}H$ | 5.8 mg/g.Ag |
| Trimethylolpropane | 400 mg/m$^2$ |
| Auxiliary coating agent: potassium poly-p-styrene sulfonate | 0.7 mg/m$^2$ |
| Surface protective layer | |
| Binder: gelatin | 0.7 g/m$^2$ |
| Auxiliary coating agent: | 12 mg/m$^2$ |

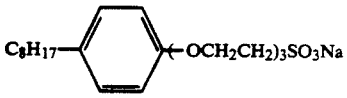

| | |
|---|---|
| Antistatic Agent: | 2 mg/m$^2$ |

$C_8F_{17}SO_2N(C_3H_7)CH_2COOK$

| | |
|---|---|
| Film hardener: 1,2-bis(vinylsulfonulacetamedo)ethane | $2.3 \times 10^{-4}$ mol/m$^2$ |
| Matting agent: polymethyl methacrylate particles (average particle size 3μ) | 0.13 mg/m$^2$ |

Sensitometry

The thus prepared samples were stored for 7 days after coating at 25° C. and a humidity of 65% RH. The various samples were subjected to exposures of 1/10 seconds from a 400 lux tungsten light through an optical wedge, and then developed in the following developing solution D-1 for each of 4 minutes and 7 minutes at 20° C., after which fixing was carried out in the fixing solution F-1 with further washing and drying. The sensitometry results are shown in Table 1.

| | |
|---|---|
| Developing solution D-1 | |
| Metol | 2 g |
| Sodium sulfite | 100 g |
| Hydroquinone | 5 g |
| Borax.$5H_2O$ | 1.53 g |
| Water | to make 1 l |
| Fixing solution F-1 | |
| Ammonium thiosulfate | 200.0 g |
| Sodium sulfite (anhydrous) | 20.0 g |
| Boric acid | 8.0 g |
| Disodium ethylenediaminetetraacetic acid | 0.1 g |
| Ammonium sulfate | 15.0 g |
| Sulfuric acid | 2.0 g |
| Glacial acetic acid | 22.0 g |
| Water to make 1 l. (The pH was adjusted to 4.2) | |

Speed measurements

Speed values were determined relatively as the reciprocal of the exposure required to obtain a transmitted blackening density of Fog +0.1.

TABLE 1

| Sample No. | Emulsion layer-2 Emulsion No. | Relative speed 4 min. | Relative speed 7 min. |
|---|---|---|---|
| 1 (Comp. Ex.) | 1 | 100 | 220 |
| 2 (Comp. Ex.) | 2 | 90 | 200 |
| 3 (Comp. Ex.) | 3 | 110 | 190 |
| 4 (The Inv.) | 4 | 180 | 320 |
| 5 (Comp. Ex.) | 5 | 120 | 310 |

TABLE 1-continued

| Sample No. | Emulsion layer-2 Emulsion No. | Relative speed 4 min. | Relative speed 7 min. |
|---|---|---|---|
| 6 (Comp. Ex.) | 6 | 140 | 290 |

Comp. Ex. = comparative example.
The Inv. = An example of the invention.

As is seen from Table 1, Sample 4 of the present invention employing a tabular emulsion comprising silver halide grains having a silver iodide content of 8 mol % (i.e., greater or equal to 3 mol %), and containing a completely uniform silver iodide phase (i.e., absence of year-ring-like structure) and a phase having at least 10 dislocation lines (i.e., greater or equal to 5 dislocation lines), had a higher speed than the comparative samples, even when the developing time was shortened.

While the invention has been described in detail and with reference to specific embodiments thereof, it will be apparent to one skilled in the art that various changes and modifications can be made therein without departing from the spirit and scope thereof.

What is claimed is:

1. A method for producing a silver halide photographic emulsion comprising:

(a) forming silver halide grain nuclei, and after completion thereof, (b) growing silver halide grains from said nuclei by forming a first silver halide phase having at least 3 mol percent of silver iodide and a completely uniform silver iodide distribution by adding fine silver halide particles having a silver halide content which is the same as the silver halide content of the first silver halide phase to be obtained, said growing being conducted with no addition of aqueous solutions of silver ions and halide ions, (c) adding an iodide compound, and (d) forming a second silver halide phase having at least five dislocation lines.

2. The method of claim 1 wherein the diameter of the fine silver halide particles is 0.1 μm or less.

3. The method of claim 2 wherein the diameter of the fine silver halide particles is 0.06 μm or less.

4. The method of claim 1 wherein a silver halide solvent is used in the formation of said first silver halide phase to increase the dissolution rate of the fine grains.

5. The method of claim 1 wherein the step of growing the silver halide grains is carried out at 50° C. or more.

6. The method of claim 5 wherein the process for growing the silver halide grains is carried out at 60° C. or more.

7. The method of claim 6 wherein the process for growing the silver halide grains is carried out at 70° C. or more.

8. The method of claim 1 wherein the fine silver halide particles are added at a fixed flow rate.

9. The method of claim 8 wherein rate of addition of the fine silver halide particles is increased over time.

10. The method of claim 1, wherein said growing is effected by carrying out Ostwald ripening to dissolve the fine particles and deposit the silver halide on the nuclei.

11. The method of claim 1 wherein the silver halide grains are tabular.

* * * * *